United States Patent [19]
Schottler

[11] 3,707,888
[45] Jan. 2, 1973

[54] VARIABLE SPEED TRANSMISSION

[75] Inventor: Henry Schottler, North Riverside, Ill.

[73] Assignee: Roller Gear Ltd., Zug, Zug, Switzerland

[22] Filed: July 31, 1970

[21] Appl. No.: 60,073

[52] U.S. Cl..................................74/796, 74/208
[51] Int. Cl.......................F16h 15/50, F16h 13/14
[58] Field of Search.....................74/796, 198, 200

[56] References Cited

UNITED STATES PATENTS

| 2,696,888 | 12/1954 | Chillson et al. | 74/796 X |
| 2,701,970 | 2/1955 | Kraus | 74/796 X |
| 2,941,422 | 6/1960 | Barish | 74/796 |
| 3,237,468 | 3/1966 | Schottler | 74/198 |
| 3,248,960 | 5/1966 | Schottler | 74/200 |
| 3,504,574 | 4/1970 | Okabe | 74/796 |
| 2,590,800 | 3/1952 | Stephenson | 74/796 |
| 2,973,671 | 3/1961 | Elkins | 74/796 |

FOREIGN PATENTS OR APPLICATIONS

| 1,231,854 | 4/1960 | France | 74/796 |
| 446,140 | 6/1927 | Germany | 74/796 |

Primary Examiner—Milton Kaufman
Assistant Examiner—Thomas C. Perry
Attorney—Hume, Clement, Hume & Lee

[57] ABSTRACT

A variable speed transmission for transmitting torque to an output shaft at a substantially constant selected speed. Driving balls arranged in constant rolling frictional contact with pairs of inner and outer concentric and axially separable ball races. One pair of races is associated with an input shaft, and the other pair of races is associated with an output shaft. The driving balls and races engage along contact tracks defined on the races and balls to thereby transmit torque between the shafts at a speed ratio determined by the contact tracks. Control means adjusts the axial positioning of one pair of races within a selected range to infinitely vary the contact tracks and thereby vary the speed ratio. Pressure regulator means responds to differential twist torque between the shafts to maintain the balls and races in frictional rolling contact throughout said selected range of adjustment and vary the contact pressure between races and balls in proportion to the output torque.

4 Claims, 7 Drawing Figures

PATENTED JAN 2 1973

Inventor:
Henry Schottler,
By Roy E. Hofer, Melvin F. Jager
Attys

PATENTED JAN 2 1973

Inventor.
Henry Schottler.
By Roy E. Hofer, & Melvin F. Jager
Attys.

3,707,888

VARIABLE SPEED TRANSMISSION

BACKGROUND AND GENERAL DESCRIPTION

This invention relates generally to transmissions, and more particularly relates to a variable speed transmission having high torque-carrying capacity which is capable of providing infinitely variable speed reduction within a substantially wide range.

There is a continuous effort by those skilled in the transmission art to devise improved transmissions for controlling the torque output and speed of a rotary power shaft. For instance, there is a need for an improved transmission which will transmit a high level of torque to an output shaft at a speed which can be selected to suit the requirements of a particular installation. The speed range of such variable speed transmissions preferably should be sufficiently broad to include a zero speed condition, so that the transmission can be shifted easily into reverse. Furthermore, such transmissions should be designed to permit infinitely variable speed adjustment, in both positive and negative directions with respect to the zero condition, within the broad speed range.

In the same regard, there is a need for an improved variable speed transmission which has high mechanical efficiency and high torque-transmitting characteristics, and which is responsive to changes in the load on the output shaft. In contrast to conventional torque convertors, which cause the output speed to vary automatically in response to a change in output torque, the improved transmissions should transmit torque to an output shaft at a constant selected speed which will be substantially unchanged by the normal fluctuations in the loading of the output shaft.

To fulfill the above needs, the present invention provides an improved ball-type variable speed transmission system which has a substantial speed reduction range, which can include a zero condition. The transmission of the present invention is infinitely variable within the designed speed range, in either a negative or a positive direction from the zero condition. The transmission furthermore includes pressure regulating means which is responsive to variations in the output torque to adjust the operation of the transmission so that a selected output speed can be maintained substantially constant. The transmission of the present invention also has a substantially high torque-carrying capacity and high mechanical efficiency, so that power will be transmitted to an output shaft with very low losses due to friction or slippage.

To accomplish the foregoing objects, the ball-type transmission in accordance with this invention generally includes a pair of inner and outer concentric ball races. Spherical driving balls are placed between the races so as to be in constant rolling, frictional contact with each race. Each pair of races is axially separable, and control means are provided for adjusting the relative axial positioning of one pair of races. One pair of races is operatively connected for rotation with the output shaft, and the other pair of races is operatively connected for rotation with the input shaft. The driving balls transmit torque through the races by rolling along the inner and outer races along circular contact tracks of different lengths defined on the engaged surfaces of the balls and races.

Moreover, a pressure regulating system responsive to differential twist torque due to fluctuations in the output load is associated with one pair of races and arranged to vary the axial pressure between the races and the driving balls, in proportion to the output load. The pressure regulator means also maintains the balls in frictional rolling contact with the races for each setting of the control means so that the speed reduction ratio of the transmission will be maintained constant. The races also are preferably designed to have a substantial rolling surface for contact with the driving balls, so that the transmission has a substantially high torque-carrying capacity.

EXEMPLARY EMBODIMENT

Further objects and features of the invention will become apparent from the following description of an exemplary embodiment thereof, taken in conjunction with the accompanying drawings, in which.

The variable speed transmission unit embodying the features of the invention is generally indicated in the drawings by the reference numeral 10. The transmission unit 10 includes a sealed housing 12 having a removable cover plate 14. The center of the cover plate 14 contains a needle bearing 16 which rotatably supports a centrally disposed input shaft 20. A suitable gasket 18 seals the joint between the housing 12 and the cover plate 14 and bolts 19 are spaced around the cover plate 14 to secure the cover plate to the housing 12.

Figure 1:
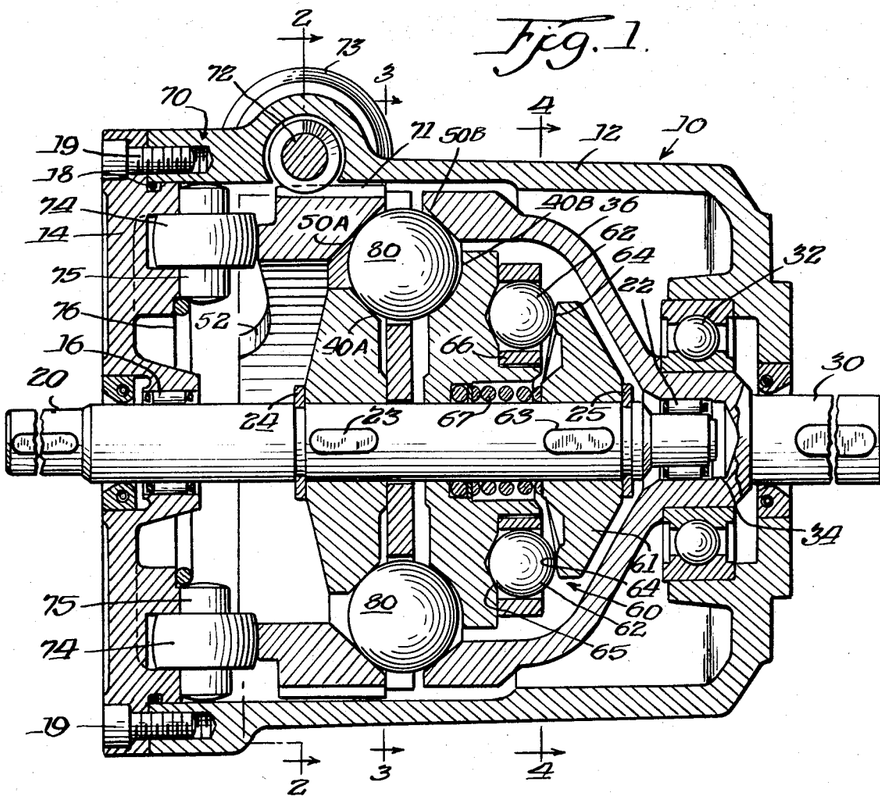
FIG. 1 is a longitudinal sectional view of a variable speed transmission incorporating the features and advantages of the present invention.

The transmission unit 10 further includes a centrally disposed output shaft 30. As illustrated in FIG. 1, the output shaft 30 is rotatably supported in the housing 12, on the end of the housing opposite the cover plate 14, within a suitable bearing 32. The inner end of the output shaft 30 in the illustrated embodiment defines a recess 34 to receive the adjacent projecting end of the input shaft 20. A second set of needle bearings 22 is provided within the recess 34 to support that end of the input shaft 20. By this arrangement, the shafts 20 and 30 are in axial alignment along the center of the transmission housing 12, and are mounted for independent rotation with respect to the housing.

The transmission unit 10 in accordance with this invention further includes a pair of aligned inner drive races 40A and 40B and a pair of aligned outer drive races 50A and 50B. As indicated in FIG. 1, the races 40 and 50 are concentrically arranged with respect to the input and output shafts 20 and 30, respectively, within the transmission housing 12. One of the inner races 40A is keyed directly to the input shaft 20 by a suitable keyway 23. A retaining ring 24 prevents the inner race 40A from axial movement on the shaft 20 during operation of the transmission 10. The other inner race 40B is loosely positioned on the shaft 20 axially adjacent the race 40A. The race 40B is joined for rotation with the input shaft 20 by means of a torque-responsive pressure regulating mechanism 60. A retaining ring 25 prevents axial shifting of the pressure regulator 60 with respect to the input shaft 20. The pressure regulator 60 responds to variations in the torque load on the output shaft 30 to proportionately vary the force by which the inner race 40B is urged axially toward the inner race 40A during operation of the transmission unit 10.

One of the outer races 50A is positioned in radial alignment with the inner race 40A and is arranged to have a selected constant speed of rotation during the operation of the transmission unit 10. As shown in FIG. 1, the race 50A in the preferred embodiment is fixed from rotation within the interior of the transmission housing 12. This fixed outer race 50A is axially movable with respect to the other races 50B and 40A and B to vary the speed reduction ratio of the transmission unit 10. The other outer race 50B is rigidly joined to the output shaft 30 by means of an integral conical portion 36. The outer race 50B therefore will rotate in unison with the output shaft 30.

Figures 2, 5, 6:
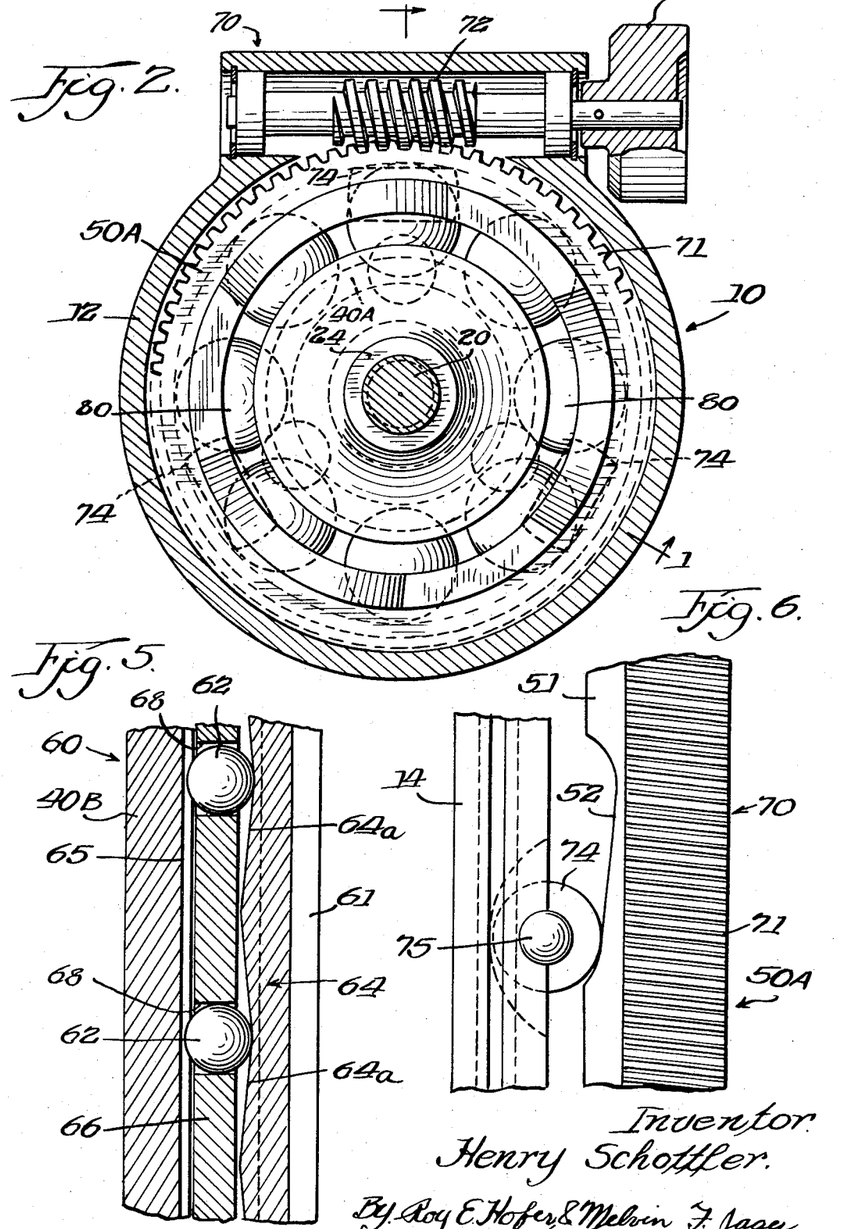
FIG. 2 is a cross sectional view of the transmission, taken along the line 2—2 in FIG. 1.
FIG. 5 is a developmental view of the torque-responsive system illustrated in FIG. 4.
FIG. 6 is a developmental view of the adjustable mechanism for varying the speed reduction ratio of the transmission.

The system for fixing the outer race 50A against rotation and for shifting race 50A axially within the transmission housing 12 is generally indicated in FIG. 1 by the reference numeral 70. The control mechanism 70 includes a ring gear 71 surrounding the periphery of the race 50A. As shown in FIG. 2, a worm gear 72 is mounted on the exterior of the housing 12 in engagement with the ring gear 71. A control handle 73 on the worm gear 72 permits the ring gear 71 to be selectively rotated to vary the circumferential positioning of the outer race 50A. The ring gear 71 and the worm gear 72 engage to fix the outer race 50A against rotation within the transmission housing 12 during the operation of the transmission, but permit the race 50A to be selectively shifted in an axial direction by operation of the control handle 73.

The control mechanism 70 also includes means for shifting the outer race 50A axially in response to the operation of the handle 73. In this respect, the cover plate 14 supports a plurality of uniformly spaced cam rollers 74. The rollers 74 are freely rotatable on radial roller pins 75 which are retained in recesses in the cover plate 14 by means of a snap ring 76. As illustrated by the developmental view shown in FIG. 6, the outer race 50A includes an annular portion 51 which surrounds the input shaft 20 in axial alignment with the rollers 74. The annular portion 51 is provided with a series of cam recesses 52 which receive the rollers 74. As seen in FIGS. 1 and 6, the cam recesses 52 are inclined axially so that the rollers 74 will roll in the recesses and shift the race 50A a selected axial distance for a given degree of rotation of the annular portion 51 of the race. Since the axial position of the rollers 74 is fixed by the engagement of the roller pins 75 with the cover plate 14, the rotation of the race 50A by means of the worm gear 72 and ring gear 71 will cause the rollers 74 to ride in recesses 52 and shift the race 50A in the above-described manner.

Figure 3:
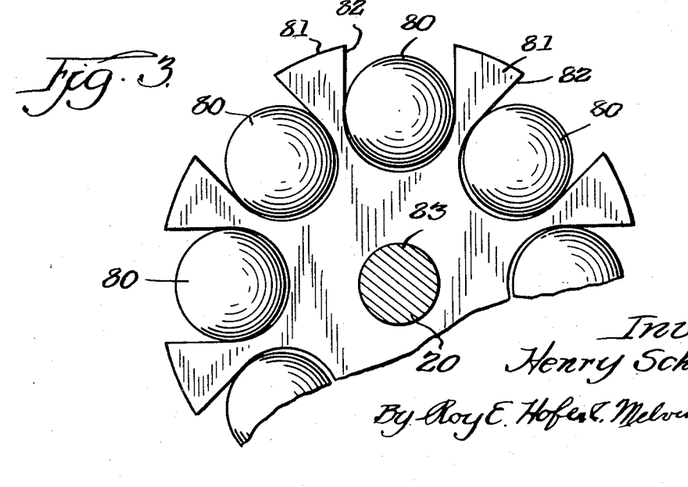
FIG. 3 is a partial sectional view of the ball retainer means and driving balls incorporated in the transmission, as viewed along the line 3—3 in FIG. 1.

The transmission unit 10 in accordance with this invention also includes a set of spherical driving balls 80. As illustrated in FIGS. 1 and 3, the balls 80 are positioned uniformly around the input shaft 20 in a ball retainer 81. Peripheral slots 82 in the retainer 81 permit each of the balls 80 to be shifted in a radial direction during the operation of the transmission. The retainer 81 has a central aperture 83 which fits loosely around the input shaft 20 so that the balls 80 and retainer 81 are free to rotate independently of the input shaft 20. As shown in FIG. 1, the balls 80 are positioned axially within the transmission housing 12 so that each ball is in constant rolling, frictional contact with each of the ball races 40A, 40B, 50A, and 50B.

Figures 4, 7:
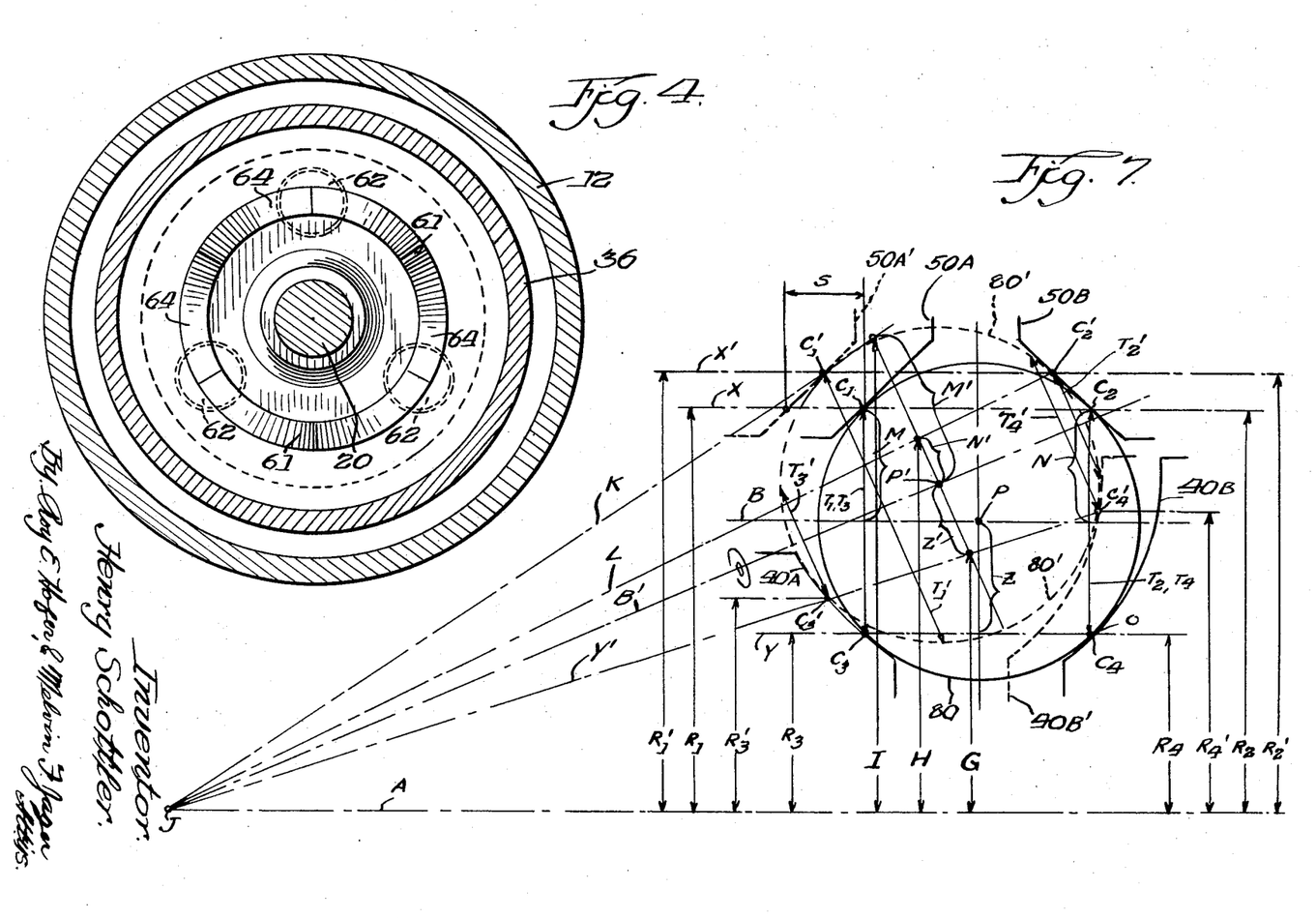
FIG. 4 is a cross sectional view taken along the line 4—4 in FIG. 1, illustrating the torque-responsive pressure regulating system incorporated in the transmission.
FIG. 7 is an enlarged schematic view of the driving balls and the races of the transmission, illustrating the manner in which the speed reduction ratio of the transmission is determined.

During the operation of the transmission unit 10, the balls 80 will transmit torque between the input and output shafts 20 and 30 by rolling engagement with the outer races 50A and 50B along circular tracks defined by contact points $C_1$ and $C_2$, respectively, and by simultaneous rolling engagement with the inner races 40A and 40B along circular tracks defined by contact points $C_3$ and $C_4$, respectively. The track radii at which the driving balls 80 will orbit around the axis A of the shafts 20 and 30, while engaged with the contact points $C_1$–$C_4$ are illustrated in FIG. 7 as $R_1$–$R_4$, respectively. Similarly, the circumferential tracks on the balls 80 along which the balls engage with the races 40A and B and 50A and B at contact points $C_1$–$C_4$ are indicated in FIG. 7 by the dimensions $T_1$–$T_4$, respectively. During the operation of the transmission unit 10, the relative speeds of the shafts 20 and 30 will be determined by the relationship between the race track radii $R_1$–$R_4$ and the circumferential length of the ball tracks $T_1$–$T_4$.

The pressure regulator 60 is provided in the transmission unit 10 to assure non-slipping, frictional rolling of the driving balls 80 along the races 40 and 50 by varying the contact pressure between the balls and races in response to variations in the load applied to the output shaft 30. To accomplish that function, the regulator 60 is associated with the inner races 40A and B, opposite from the control and output races 50A and 50B. As seen in FIGS. 1 and 5, the regulator 60 includes a cam member 61 and a set of uniformly spaced pressure rollers 62. The cam member 61 is secured for rotation with the input shaft 20 by means of a suitable key 63. An annular portion of the cam member 61 is in axial alignment with the rollers 62 and defines recessed cam pockets 64 for each of the rollers. The cam pockets 64 have a selected uniform depth and have uniformly inclined cam surfaces 64A along which the rollers 62 will roll.

An annular roller groove 65 is provided in the inner race 40B in axial alignment with the cam pockets 64 to engage with the rollers 62 constantly to retain the rollers within the cam pockets 64. A roller retainer 66 is loosely positioned around the inner race 40B, and includes axial apertures 68 for freely receiving the rollers 62. The retainer 66 thereby operates to maintain the rollers 62 in radial alignment with respect to the cam pockets 64, but allows the rollers to shift axially within the apertures 68. Also, a suitable compression spring 67 is positioned between the cam member 61 and the ball race 40B. The spring 67 preloads the transmission unit 10 by establishing a constant initial contact pressure between the driving balls 80 and the ball races 40 and 50.

The above-described components of the pressure regulator 60 function to vary the contact pressure between the balls 80 and races 40 and 50 in proportion to the change in the torque load on the output shaft 30. The regulator 60 senses differential twist torque between the shafts 20 and 30 created by load, fluctuations, and responds by adjusting the axial positioning of the associated inner races 40A and 40B. In this manner, the regulator 60 maintains frictional rolling contact between the balls 80 and races 40 and 50 throughout the range of adjustment of the variable speed transmission unit 10. The unit 10 thereby can be operated at a constant selected speed reduction ratio within its range.

To begin the operation of the transmission unit 10, the control mechanism 70 first is adjusted to place the control race 50A in a position to provide the desired speed reduction ratio. Then, an input torque can be applied to the input shaft 20 by any suitable means (not shown) to rotate the shaft 20 at the desired input speed. As seen in FIG. 1, the inner race 40A will rotate in unison with the input shaft 20 due to the key 23. The inner race 40B likewise will rotate with the input shaft 20 due to the action of the pressure regulator 60 and the preload spring 67.

Thus, the rotation of the input shaft 20 tends to urge the driving balls 80 to roll around the inner races 40A and B in a planetary fashion, along the race tracks defined at the contact points $C_3$ and $C_4$, respectively. The planetary drive balls 80 in turn roll along the outer races 50A and B in engagement with the outer race tracks defined at contact points $C_1$ and $C_2$, respectively. Since the outer control race 50A is fixed from relative rotation, the driving balls 80 transmit a reaction torque from the inner input races 40A and B which will cause the outer output race 50B and the connected output shaft 30 to rotate in the bearing 32, unless the unit is adjusted to its zero output condition. The adjustment of the unit in a positive direction beyond the zero condition will cause the output shaft 30 to rotate in the same direction as the input shaft 20 and adjustment in a negative direction will cause the output shaft 30 to rotate in a reversed direction.

The arrangement of the transmission unit 10 as illustrated in the drawings, wherein the track radius $R_2$ for the output race 50B is larger than the track radii $R_3$ and $R_4$ for the input races 40A and 40B, provides for speed reduction between the input shaft 20 and output shaft 30. The transmission until 10 thereby operates as a variable speed reducer. Of course, it will be appreciated by those skilled in the art that the operation of the unit 10 can be reversed by driving the shaft 30 instead of the shaft 20. The unit 10 then will operate in a similar manner as a variable speed increaser.

The pressure regulator 60 operates to assure that the driving balls 80 will roll in a planetary fashion around the races 40 and 50 with substantially no slippage despite variations in the load on the output shaft 30. When there is no load, or only a very slight load, on the output shaft 20, the preload spring 67 maintains contact pressure between the balls 80 and races 40 and 50 by urging the inner race 40B axially toward the inner race 40A. The pressure regulator 60 functions to control the contact pressure between the balls 80 and races 40 and 50 when any substantial load is applied to the output shaft 30. The regulator 60 also operates to maintain the balls 80 and races 40 and 50 in a substantially fixed relationship, as set by the adjusting mechanism 70, and thereby assures a constant output speed for the shaft 30.

More specifically, an increase in the load on the shaft 30 will cause a retarding or braking force to be transmitted to the driving balls 80, at the contact point $C_2$, through the output race 50B. As the rotation of the input shaft 20 and inner race 40A continues. This braking force creates a substantially equal and opposite reaction force which is transmitted through the balls 80 to the inner race 40B at the contact point $C_4$. Since the race 40B is free, the resulting reaction force tends to rotate the race 40B. Any angular movement of the race 40B is transmitted by the groove 65 to the pressure rollers 62. The rollers 62 in turn are urged to leave the cam pockets 64 and roll up the cam surfaces 64A (to the left in FIG. 1). The rollers 62 are urged against the groove 65 by the inclination of the cam surfaces 64A. The pressure regulator 60 hence urges the inner race 40B toward the inner race 40A with a force that is proportional to the load on the output shaft 30. The contact pressure between the races 40 and 50 and the balls 80 is thereby varied in direct response to the load on the output shaft 30 and slippage of the balls 80 is prevented. The regulator 60 also thereby maintains the balls and races in a selected relationship so that the speed reduction ratio of the unit is constant.

The manner in which the transmission unit 10 operates to provide infinitely variable speed reduction between the input shaft 20 and the output shaft 30 is schematically illustrated by FIG. 7. The relatively fixed outer race 50A is used as the control race, and the opposite outer race 50B, joined integrally with the output shaft 30, functions as the output race. As indicated in FIG. 7, the outer races 50A and B define flat, angled tracks around which the driving balls 80 will roll along circular paths defined by a series of contact points $C_1$ and $C_2$, respectively. The use of one of the output races as the control race in this manner greatly simplifies the design and operation of the variable speed transmission in accordance with this invention.

The angle of the races 50A and B with respect to central axis A of the shaft 20 is selected to provide the desired operating characteristics for the transmission unit 10. In the illustrated embodiment, the outer races 50A and B are arranged at a 45° angle with respect to the axis A. The use of equal 45° angles for both outer races simplifies the design of the unit by arranging the races so that the contact points $C_1$ and $C_2$ are in axial alignment and the race track radii $R_1$ and $R_2$ are equal for all settings of the variable transmission unit 10.

The track surfaces of the inner races 40A and B are also designed to have a selected configuration. The surface of the inner race 40A preferably is arranged generally parallel to the surface of the diametrically opposed race 50B. This arrangement minimizes the axial thrust on the shafts 20 and 30 by providing substantially parallel surfaces 40A and 50B between which the drive balls 80 can shift as the speed reduction ratio of the unit 10 is changed by the control mechanism 70.

Since the inner races 40A and B are important with respect to the torque-carrying capacity of the unit 10, the track surface for the race 40A is arcuate or concave in the preferred embodiment of this invention. As illustrated in FIG. 7, the slight concavity of the race 40A, on the order of a radius of curvature equal to approximately the diameter of the drive balls 80, eliminates point contact between the balls and the race 40A. The surface area of contact between the race 40A and the balls 80 is thereby enlarged, and the carrying capacity of the transmission unit is increased proportionally. Since the width of the resulting contact area between the drive balls 80 and the inner race 40A is in the order of a few thousandths of an inch, it is not discernible on the drawings. Hence, for purposes of illustration, the engagement between the balls 80 and the inner race 40A is illustrated in FIG. 7 as the contact point $C_3$, which occurs at a contact track radius $R_3$.

The track surface of the other inner race 40B also has a selected concave curvature. The radius of curvature of the race 40B is substantially greater than the radius of the engaged driving balls 80, and is selected to be substantially different from the slight curvature designed into the track surface of the race 40A. The radius of curvature and extent for the track on race 40B depends upon the operating characteristics desired for the transmission unit 10. In the preferred arrangement of this invention, as seen in FIG. 1 and 7, the track surface of race 40B is arranged with respect to the surface of race 40A to provide a zero point 0, and has an arcuate extent that is sufficient to allow the driving balls 80 to engage the race on both sides of the zero point 0. By that arrangement, speed adjustment can occur in both positive and negative directions with respect to that zero point. The driving balls 80 will engage with the race 40B along contact points at a track radius $R_4$.

As shown in FIG. 7, the upward positive side of the race 40B, above the zero point 0 is more extensive than the lower negative side in the usual arrangement. Hence, under normal circumstances, the speed range is broader in the positive drive direction than in the negative or reverse direction. Of course, the unit 10 can be arranged to provide equal speed adjustment in the positive and negative directions, or broader adjustment in reverse, if desired for a particular installation.

It is evident from FIG. 7 that the driving balls 80 will roll along the races 40 and 50 in engagement with the contact points $C_1$–$C_4$, at the track radii $R_1$–$R_4$, during the operation of the transmission unit 10. The balls 80 will thereby orbit in a planetary fashion around the axis A of input shaft 20. At the same time, each of the balls 80 is rotated on its own central axis B which is perpendicular to the ball tracks $T_1$–$T_4$. The speed ratio between the input shaft 20 and the output shaft 30 hence is a function of the relationship between the track radii $R_1$–$R_4$ and the ball tracks $T_1$–$T_4$.

For instance, if the transmission unit 10 is operated with the components arranged as shown in solid lines in FIG. 7, the track radii $R_1$ and $R_2$ for the outer races 50A and B are equal, and the track radii $R_3$ and $R_4$ for the inner races 40A and B are likewise equal. Due to this arrangement, the balls 80 will rotate on their own axes B at an effective radius M with respect to the fixed control race 50A; an effective radius N with respect to the output race 50B; and an effective radius Z with respect to the input control races 40A and 40B. Moreover, the length of the surface tracks $T_1$ through $T_4$ on the balls 80 are equal. This setting of the transmission unit 10 arranges the ball axis B parallel to the shaft axis A, and also parallel to the line X extending through the contact points $C_1$ and $C_2$ for the outer races 50A and B and the line Y extending through the inner races 40A and B.

The parallel arrangement of the lines A, B, X, and Y, in the solid line condition shown in FIG. 7, causes these lines to intersect at infinity. Hence, the balls 80 will orbit about the axis A of the shaft 20 as simple ball bearings, and there will be no speed differential or relative movement between the outer races 50A and B. Under such conditions, the output race 50B remains stationary, since the control race 50A is fixed from rotation, and the speed of the output shaft 30 is zero.

The arrangement of the balls 80 as illustrated in solid lines in FIG. 7 is therefore the zero condition for the transmission unit 10, where the contact point $C_4$ coincides with the zero point 0. Generally, this zero condition will occur whenever the lines X, Y, and B intersect at a common point with the central axis A. If the races 50A and B are arranged in a different alignment, so that the contact line X is not parallel to the axis A, the lines A, B, X, and Y will intersect at some finite point, and the zero condition for the unit 10 will simulate a standard tapered roller bearing.

To move the unit 10 out of the zero condition and vary the speed reduction ratio, the control race 50A is shifted axially by operation of the control mechanism 70. When the adjustment of the control race 50A changes the relationship of the contact points $C_1$–$C_4$ so that the lines B, X, and Y do not intersect the axis A at a common point, the relationships between the track radii R and the ball tracks T are changed in a manner which produces a speed differential between the output race 50B and the control race 50A. Generally, the speed differential between the races 50A and B increases as the contact lines X and Y diverge from their common intersecting point on the axis A.

Thus, as viewed in FIG. 7, the speed of the output shaft 30, connected to the output race 50B, will increase gradiently as the contact point $C_4$ is moved upwardly from the zero point 0 on the race 40B. In a similar fashion, the output speed of the shaft 30 in a negative or reverse direction will increase gradiently as the control race 50A is shifted to move the contact point $C_4$ downward on the race 40B, as viewed in FIG. 7. Of course, the control race 50A can be positioned to maintain the contact point $C_4$ at any selected point along the race 40B, so that the output shaft 30 is maintained at a selected constant speed.

A setting for the unit 10 which provides a selected constant speed reduction ratio is illustrated in dotted lines in FIG. 7. To produce this arrangement, the control mechanism 70 is operated to shift the control race 50 through an axial distance S. As indicated in FIG. 7, this shifting causes the driving balls 80 to move upwardly between the diametrically opposed races 40A and 50B under the influence of the pressure regulator 60 and the preload spring 67. As a result, the locations of the contact points are changed to $C'_1-C'_4$, respectively. Such an adjustment of the control race 50A also changes the track radii to $R'_1-R'_4$, and the ball tracks to $T'_1-T'_4$, respectively. Since the angles of the races 50A and B are equal, the adjustment of the control race 50A in the illustrated embodiment did not alter the relationship between the track radii $R_1$ and $R_2$ or the alignment of the contact line X with respect to the axis A. Thus, as seen in FIG. 7, $R'_1$ continues to equal $R'_2$, and the newly established contact line X' continues to be parallel to the axis A. However, the shifting of the control race 50A through the axial distance S substantially modified the relationship between the track radii $R_3$ and $R_4$, the ball tracks $T_1-T_4$, and the alignment of the contact line Y with the axis A. As a result, the newly established contact line Y' no longer intersects the contact line X' at a common point along the axis A (e.g., at infinity), and the torque from the input races 40A and B will be transmitted to the balls 80 to drive the output race 50B at a reduced speed which is a function of the relative track radii $R'_1-R'_4$ and ball tracks $T'_1-T'_4$.

More specifically, the adjustment of the unit 10 out of its zero condition changes the relationship of the races 40 and 50 so that the central axis for each ball 80' is changed into a position illustrated by the axis B' in FIG. 7. Similarly, the center point P of the ball 80 shifts from the point P to the point P'. The new ball axis B' intersects the unit axis A at a finite point J. The new contact line Y', through the input race contact points $C'_3$ and $C'_4$ also intersects the axis A at point J, since the associated input races 40A and 40B are joined for rotation in unison with the shaft 20 around the axis A.

In the new position, as shown by the dotted lines in FIG. 7, the balls 80' thereby operate in the manner of a planetary gear, and orbit about the shaft axis A while simultaneously rotating about the ball center line B'. The effective radius at which the ball 80' rolls on the inner input races 40A and 40B under these conditions is Z', as established by the intersection between the contact line Y' and the rolling diameter of the ball 80'. Similarly, the effective radius at which the balls 80' roll on the control race 50A is M', as established by the intersection of the ball rolling diameter with the line K drawn between the point J and the contact point $C'_1$. In the same regard, N' in FIG. 7 represents the effective rolling radius of the ball 80' with respect to the output race 50B, as established by the intersection of the ball rolling diameter with the line L between the point J and the contact point $C'_2$. The effective orbiting radii for these points along the ball rolling diameter are shown by the dimensions G, H, and I in FIG. 7.

Since the driving balls 80' will function as a planetary gear system during the operation of the transmission unit 10, the speed reduction ratio ($i$) for the unit is a function of the speed of the output race 50B ($n$-out) at the contact point $C_2$ with respect to the speed of the input races 40A, B ($n$-in) at the contact points $C_3$, $C_4$. Hence, $$i = (n\text{-out})/(n\text{-in}) = n(C_2)/n(C_3, C_4); \quad (1)$$

or $$i = (M - N \cdot I/H)/(M + Z \cdot I/G) \quad (2)$$

For instance, applying equation (2) to the zero condition for the unit 10 shown in solid lines in FIG. 7, $M = N = \frac{1}{2} T_{(1-4)}$; and $I = H = R_{(1,2)}$. Thus, in the zero condition:

$$(3) \quad i = \frac{T/2 - T/2 \cdot \frac{R}{R}}{T/2 + Z \cdot \frac{R}{G}} = 0$$

The output speed for the race 50B (point $C_2$) and the connected output shaft 30 is likewise zero. At any other adjustment, such as shown in dotted lines in FIG. 7, the speed ratio ($i$) depends upon the dimensions and geometry of the particular transmission unit 10.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A variable speed transmission comprising:

first and second rotatable shaft means;

a first pair of annular races defining circular concentric tracks, with one of said first races being axially shiftable and including means to prevent rotation thereof during the operation of the transmission, and the other first race being joined for imparting rotation to said first shaft means;

a second pair of annular races, one of said second races being joined for rotation in an axially fixed position to said second shaft and defining a circular contact track, substantially parallel to said track defined by said other first race, and the other second race defining a concave contact track having a selected radius of curvature;

spherical drive ball means positioned between said races in frictional rolling engagement with said contact tracks to transmit torque between said pairs of races at a speed ratio determined by the relationship of said contact tracks, said ball means having a radius smaller than the radius of curvature of said concave track defined by said other second race;

speed control means for infinitely varying the axial position of said one first race within a selected range, to move said drive ball means along said concave contact track and between said substantially parallel contact tracks defined on said one second race and said other first race and thereby infinitely vary the relationship between said contact tracks and the resulting speed ratio of said transmission; and a torque-responsive pressure regulator joining said other second race to said second shaft, said regulator comprising; an annular cam member joined for rotation with said second shaft and defining cam lobe means extending axially toward said other second race, and cam rolling means positioned between said cam member and said other second race and engagable with said cam lobe means to simultaneously rotate said other second input race in response to the rotation of said second shaft and to urge said second races axially with respect to each other and thereby vary the contact pressure between said drive ball means and said races in proportion to the differential twist torque existing between said second races, said pressure regulator further being arranged to provide relative axial movement of said second races in response to the adjustment of said speed control means which permits said drive ball means to move along said concave track between said parallel contract tracks defined by said one second race and said other first race;

whereby said pressure regulator permits a selected speed ratio to be established by said speed control means and maintains said drive ball means in frictional rolling engagement with said races such that each selected speed ratio established within said range will be substantially constant.

2. A variable speed transmission in accordance with claim 1 wherein said concave track defined by said other second race is opposed to said control race along a diameter of said drive ball means.

3. A variable speed transmission comprising:

input and output shafts;

a pair of annular output races defining circular contact tracks with one of said output races being axially shiftable and including means to prevent rotation thereof during the operation of the transmission, and the other output race being joined for imparting rotation to said output shaft;

a pair of annular input races, one of said input races being joined for rotation in an axially fixed position to said input shaft and defining a circular contact track substantially parallel to said track defined by said other output race, and the other input race defining a concave contact track having a selected radius of curvature;

spherical drive ball means positioned between said races in frictional rolling engagement with said contact tracks to transmit torque between said pairs of races at a speed ratio determined by the relationship of said contact tracks, said ball means having a radius smaller than the radius of curvature of said concave track defined by said other input race;

speed control means for infinitely varying the axial position of said one output race within a selected range, to selectively move the drive ball means along said concave track and between said substantially parallel contact tracks defined on said one input race and said other output race and thereby infinitely vary the relationship between said contact tracks and the resulting speed ratio of said transmission; and a torque-responsive pressure regulator joining said other input race to said input shaft, said regulator comprising; an annular cam member joined for rotation with said input shaft and defining cam lobe means extending axially toward said other input race, and cam rolling means positioned between said cam member and said other input race and engagable with said cam lobe means to simultaneously rotate said other input race in response to the rotation of said input shaft and to urge said input races axially with respect to each other and thereby vary the contact pressure between said drive ball means and said races in proportion to the differential twist torque existing between said input races, said pressure regulator further being arranged to provide relative axial movement of said input races in response to the adjustment of said speed control means which permits said drive ball means to move along said concave track between said parallel contact tracks defined by said one input race and said other output race;

whereby said pressure regulator permits a selected speed ratio to be established by said speed control means and maintains said drive ball means in frictional rolling engagement with said races such that each selected speed ratio established within said range will be substantially constant.

4. A variable speed transmission comprising:

first and second rotatable shaft means;

a first pair of annular races defining circular concentric tracks, with one of said first races being axially shiftable and including means to prevent rotation thereof during the operation of the transmission, and the other first race being joined for imparting rotation to said first shaft means;

a second pair of annular races, one of said second races being joined for rotation in an axially fixed position to said second shaft and defining a circular contact track substantially parallel to said track defined by said other first race, and the other second race defining a concave contact track having a selected radius of curvature;

spherical drive ball means positioned between said races in frictional rolling engagement with said contact tracks to transmit torque between said pair of races at a speed ratio determined by the relationship of said contact tracks, said ball means having a radius smaller than the radius of curvature of said concave track defined by said other second race;

speed control means for infinitely varying the axial position of said one first race within a selected range, to move said drive ball means along said concave contact track and between said substantially parallel contact tracks defined on said one second race and said other first race and thereby infinitely vary the relationship between said contact tracks and the resulting speed ratio of said transmission; and a torque-responsive pressure regulator means joining said other second race to said second shaft means, said regulator means comprising;

an annular cam member connected for rotation with said second shaft means including a plurality of cam lobes extending axially toward other said other second race, with each lobe defining a pair of symmetrical cam rise surfaces;

annular non-lobed roller track means axially aligned with said cam lobes and joined for rotation with said other second race;

and a plurality of cam rolling means positioned between said cam lobes and said roller track means and engagable with said cam lobes to simultaneously roll along said roller track in a single geometric plane and to rotate said other second race in response to the rotation of said second shaft means and further to urge said second races together for either clockwise or counter-clockwise rotation of said second shaft means;

said pressure regulator thereby varying the contact pressure between said second races and ball means in proportion to the differential twist torque existing between said second races and maintaining said ball means in frictional engagement with said races for each selected speed ratio within said range, so that the selected speed ratio will be maintained substantially constant for each direction of rotation of said second shaft means.

* * * * *